United States Patent
Gallet

(10) Patent No.: US 11,280,220 B2
(45) Date of Patent: Mar. 22, 2022

(54) TURBOMACHINE WITH AXIAL FORCE ADJUSTMENT AT A BEARING

(71) Applicant: SAFRAN AIRCRAFT ENGINES, Paris (FR)

(72) Inventor: Francois Gallet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 156 days.

(21) Appl. No.: 16/552,953

(22) Filed: Aug. 27, 2019

(65) Prior Publication Data
US 2020/0072081 A1 Mar. 5, 2020

(30) Foreign Application Priority Data
Aug. 28, 2018 (FR) ...................................... 1857721

(51) Int. Cl.
*F01D 25/16* (2006.01)
*F01D 25/18* (2006.01)

(52) U.S. Cl.
CPC ............ *F01D 25/18* (2013.01); *F01D 25/16* (2013.01); *F05D 2220/323* (2013.01); *F05D 2240/20* (2013.01); *F05D 2240/50* (2013.01)

(58) Field of Classification Search
CPC ...... F01D 25/16; F01D 25/162; F01D 25/164; F01D 25/18
See application file for complete search history.

(56) References Cited

U.S. PATENT DOCUMENTS

| | | | | |
|---|---|---|---|---|
| 3,491,536 A | * | 1/1970 | Stafford | F16C 35/06 60/798 |
| 4,789,253 A | * | 12/1988 | Perego | F01D 25/164 384/517 |
| 5,433,584 A | * | 7/1995 | Amin | F01D 21/045 415/229 |
| 5,791,789 A | * | 8/1998 | Van Duyn | F16C 19/527 384/624 |

(Continued)

FOREIGN PATENT DOCUMENTS

| | | |
|---|---|---|
| DE | 3801590 A1 | 8/1988 |
| EP | 2050932 A2 | 4/2009 |

(Continued)

OTHER PUBLICATIONS

Preliminary Research Report received for French Application No. 1857721, mailed on May 24, 2019, 2 pages (1 page of French Translation Cover Sheet and 1 page of original document).

*Primary Examiner* — Justin D Seabe
(74) *Attorney, Agent, or Firm* — Womble Bond Dickinson (US) LLP

(57) ABSTRACT

A turbomachine including a stator, a rotor mounted on a shaft, a first bearing and a second bearing downstream of the first bearing in a direction of air circulation at the inlet of the turbomachine, the first bearing forming an axial abutment linked to the stator, the second bearing including an inner ring secured to the shaft and an outer ring mounted on an arm secured to the stator, the second bearing including rolling elements in axial support on the inner ring and on the outer ring. The outer ring includes a radially extending ring portion. The turbomachine also includes an axial force application device mounted between the arm and the ring portion.

12 Claims, 3 Drawing Sheets

(56) References Cited

U.S. PATENT DOCUMENTS

| | | | |
|---|---|---|---|
| 6,846,158 B2* | 1/2005 | Hull | F01D 25/164 |
| | | | 384/99 |
| 9,115,598 B2* | 8/2015 | Van Duyn | F01D 25/16 |
| 2017/0219009 A1 | 8/2017 | Fletcher et al. | |

FOREIGN PATENT DOCUMENTS

| | | |
|---|---|---|
| WO | 2012/038667 A1 | 3/2012 |
| WO | 2014/164601 A1 | 10/2014 |

* cited by examiner

TURBOMACHINE WITH AXIAL FORCE ADJUSTMENT AT A BEARING

The present invention relates to turbomachines.

It relates more particularly to the adjustment of axial force between the rotor and the stator of a turbomachine.

PRIOR ART

An aircraft turbomachine rotor includes a shaft and all the elements related thereto: disk, vane, trunnion, bearing ring, if necessary gear wheel, etc. With regard for example to the fan, an axial force is, in the majority of flight phases, exerted on the fan in the forward direction of the engine, in the upstream direction relative to the air flow at the inlet of the turbomachine. The fan twists in the air and propels the aircraft.

The turbomachines are thus usually designed so that the axial force on a rotor is exerted in a preferred direction during the majority of the operating phases. However, said axial force can be canceled or exerted in the opposite direction during some operating phases, for example phases of flight idling, stop/start of the engine, or autorotation of the fan. This phenomenon results in several deleterious effects for the turbomachine, which may require oversizing the bearings that support the rotation of the rotor or reducing the service life of said bearings.

In particular, the ball-bearing upstream of the turbomachine front module forms an axial abutment for the fan. When the axial force on said bearing is cancelled, the balls are no longer in axial support against the inner ring and against the outer ring of the bearing, and the absence of axial force implies an axial floating of the bearing balls. By "axial floating" is meant a loss of support of the balls of the bearing on the outer and inner rings, or a swing movement of the balls of the bearing relative to said rings, this movement having a component parallel to the axis of the turbomachine. Repeated shocks between the balls and the rings can accelerate the wear of the bearing, in particular in the case of a repeated alternation of the direction in which the axial force is exerted on the bearing.

Furthermore, if the bearings that support the rotation of the rotor comprise a roller bearing, there may be a radial clearance that causes centering defects of the rotor. A radial floating is thus generated, to the detriment of the service life of the bearings.

In order to maintain the axial force exerted on the rotor always in the same direction (preferred direction) regardless of the flight phases, it is known to apply air pressure on radial surfaces of the rotor, in particular during the operating phases of the turbomachine where there is a risk that the axial force is reversed.

However, this solution is complex and consumes a lot of air. In the case where the air is taken at a flowpath of a compressor of the turbomachine, the air used to maintain the axial abutment of the rotor has been previously compressed, but no longer takes part in the combustion. This degrades the overall efficiency of the turbomachine.

General Presentation of the Invention

There is therefore a need for a simple and reliable solution to allow maintaining the total axial force on the rotor in the preferred direction, regardless of the phases of flight. It is therefore sought to apply an additional axial force on the rotor during some phases of operation of the turbomachine.

A phenomenon of axial floating of the rolling of the guide bearings of the rotor must be avoided.

The desired solution preferably has minimal impacts on the overall design of the turbomachine and on its efficiency.

An additional objective, if the fan is supported by roller bearings, is to avoid a phenomenon of radial floating of the rollers relative to the bearing rings.

As such, the invention relates, in a first aspect, to a turbomachine according to claim 1.

According to the invention, an axial force is obtained, using the force application device, on the second bearing (downstream guide bearing). The axial clearance is consumed at the second bearing. In addition, an axial reaction force can be obtained at the first bearing (upstream guide bearing) which is upstream of the second bearing. The axial clearance of the first bearing is consumed and the rolling elements of the first bearing are then held in support against the rings.

The rotor is thus held in axial abutment in a preferred direction throughout the operation of the turbomachine, and particularly during the operating phases where the axial force on the rotor could be cancelled or exerted in the opposite direction.

In addition, the force application device does not alter the function of taking up, by the secured arm of the stator, the radial loads at the second bearing.

An additional advantage is that the force application device, positioned on an arm linked to the casing, does not rotate relative to the casing, which limits the frictions and heating of said device.

Other preferred and non-limiting characteristics of the turbomachine are the following, taken alone or in any one of the technically possible combinations:

the second bearing includes a tapered roller bearing;

the force application device comprises a piston and the force application device further comprises a system for supplying pressurized oil at the piston, so as to exert an axial force on the outer ring by oil supply, a chamber of said piston can be partly secured to the outer ring, the first bearing can then comprise a damping cavity arranged between an outer surface of an outer ring of first bearing and a ring of a bearing support, the damping cavity being connected to a damping oil supply circuit, the system for supplying pressurized oil into the piston being configured to take pressurized oil in said supply circuit.

The choice of a piston supplied by pressurized oil, as force application device, is advantageous because such a piston is of low impact on the operational efficiency of the turbomachine. The axial force exerted by the piston is adjustable by the sizing of the effective surface of the piston and/or by the choice of the oil pressure;

the turbomachine further comprises a lubrication circuit configured to circulate a lubricating oil at the bearings, and comprising between the first bearing and the second bearing an enclosure intended to contain a suspension of lubricating oil droplets, the turbomachine including means for recovering the oil droplets, said recovery means being configured to collect the oil escaping from a piston chamber, whereby said oil is mixed with said droplets and collected at an oil reserve, wherein the damping oil supply circuit and the lubrication circuit can both be connected to the oil reserve;

the ring portion comprises a collar extending radially away from the shaft;

the force application device comprises a spring tending to push back the outer ring relative to the arm;

in the latter case, the spring is mounted between a bore of the arm and said ring portion;

the force application device includes magnets, for example permanent magnets comprising a coil and a movable core.

PRESENTATION OF THE FIGURES

Other features and advantages of the invention will become apparent from the following description, which is purely illustrative and non-restrictive, and is to be read in relation to the appended figures among which:

DESCRIPTION OF PREFERRED EMBODIMENTS

In the following, a turbomachine front module is described comprising a fan driven in rotation by a low-pressure shaft. A force application device is arranged between the stator and a guide bearing of said low-pressure shaft.

It will be understood, however, that the invention can be applied with the same advantages to guide bearings of other rotor elements of a turbomachine.

Figure 1:
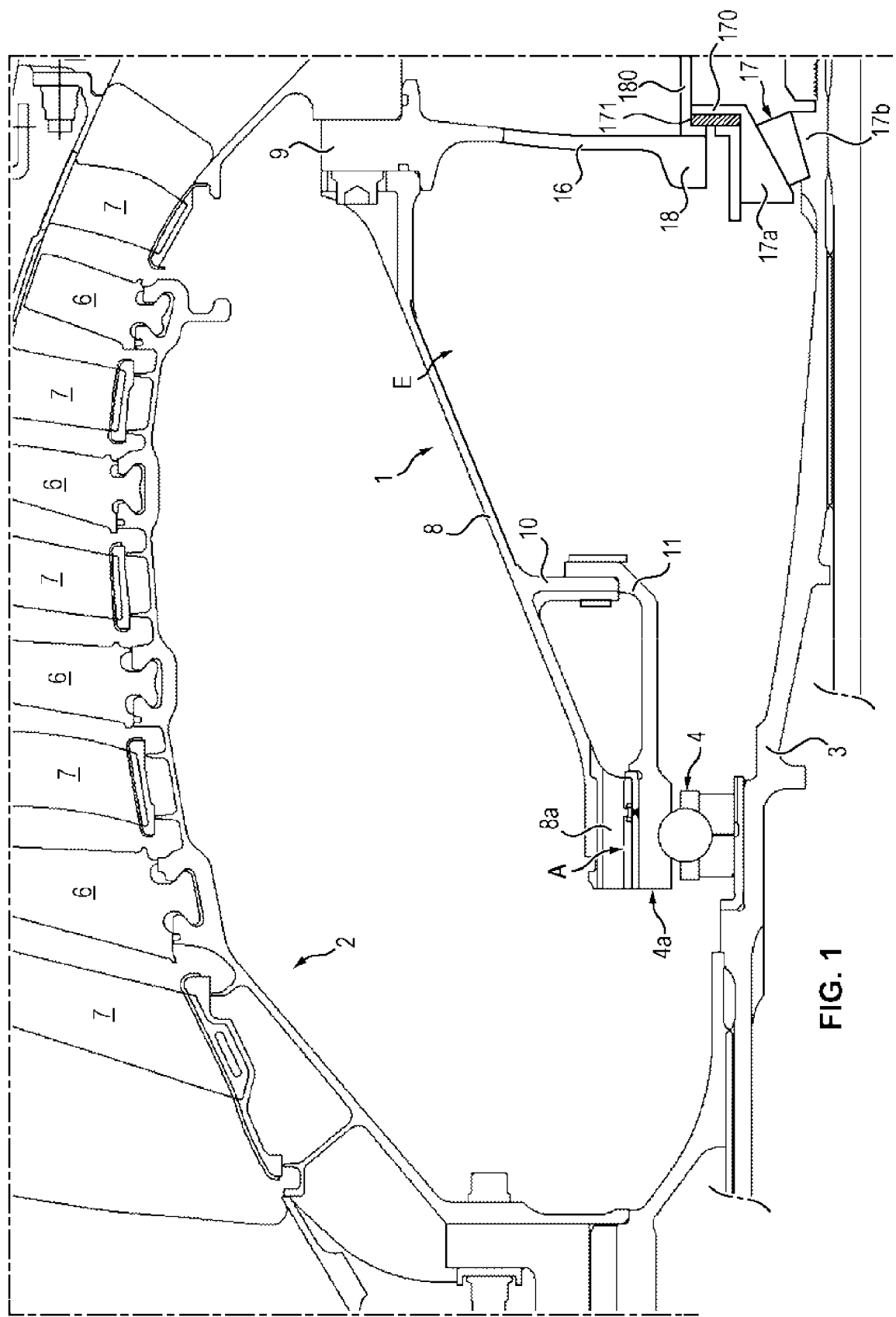
FIG. 1 is a schematic representation of a turbomachine front module according to one embodiment of the invention.

FIG. 1 represents schematically a turbomachine front module including a stator 1 and a rotor 2, whose structure is carried by a low-pressure shaft 3. The axis of the turbomachine is parallel to the horizontal, and the fan is not represented in this figure as well as in the following figures. The shaft 3 is rotatably mounted with respect to the stator 1 by means of a set of guide bearings which includes an upstream bearing 4 and a downstream bearing 17. The "upstream" and "downstream" directions are, in the following, identified relative to the normal direction of air flowing at the inlet of the front module of the turbomachine; the upstream bearing is, between the two bearings, the closest to the fan.

The upstream bearing 4 constitutes an axial abutment linked to the stator on which the shaft 3 exerts, under the effect of the rotation of the fan, a force in a given direction during the main operating phases of the turbomachine. The bearing 4 is, for example, a ball roller bearing.

However, the axial force exerted on the rolling elements of the bearing can be cancelled or reversed during some operating phases of the turbomachine, and the rolling elements may no longer be in axial abutment against the rings of the bearing. The different operating phases of the turbomachine can be identified with respect to a predetermined threshold rotational speed. Beyond said threshold, it is considered that the turbomachine is in the takeoff or cruise phase. Beyond that, it is considered that the turbomachine is in a "flight idle" phase or in an approach phase. The problem of the cancellation or reversal of axial force arises particularly during the flight idle and approach phases.

FIG. 1 also represents a second bearing 17 for guiding the shaft 3, which is located downstream of the first bearing 4. The bearing 17 comprises rolling in axial support on the rings of the bearing 17. By "rolling in axial support" is meant that the rolling is axially blocked by the rings of the bearing in at least one direction.

A ball-bearing and a tapered roller bearing are examples of bearings whose rolling is in axial support. In said examples, the rolling is blocked axially in a direction substantially parallel to that of the shaft 3, by a groove or a frustoconical surface of the rings of the bearing. The rolling of the bearing 17 is thus capable of taking up axial forces of the rotor.

In the present example, the second bearing 17 is a tapered roller bearing. Conventionally, the axis of the conical rollers is slightly inclined relative to the axis of the rotor, the downstream side of the axis of the conical rollers being inclined outwardly of the rotor.

An advantage of the bearing 17 is its ability to take up the axial forces of the fan shaft. In the event of failure of a fan blade known as "fan blade off" or FBO, the upstream bearing 4 may lose its functionality of axial retention of the fan. The axial forces of the shaft can be taken up by the bearing 17, which makes it possible to dispense with an additional part ensuring reliable axial retention of the fan, this part being known as the "fan catcher".

The bearing 4 comprises an inner ring 4b linked to the shaft 3, as well as an outer ring 4a linked to the stator via a bearing support 8 described below. The bearing 17 comprises an inner ring 17b linked to the shaft 3. Said bearing further comprises an outer ring 17a in contact with an arm 16, said arm being itself linked to the stator 1. The two outer 17a and inner 17b rings have a shape complementary to that of the tapered rollers of the bearing 17.

Furthermore, the low-pressure rotor 2 conventionally has a plurality of vanes 6, located opposite straightener vanes 7 fixed with respect to the stator 1.

Returning to the upstream bearing 4, the outer ring 4a is received in a housing ring 8a of the bearing support 8, the bearing support 8 extending longitudinally from said ring to a flange 9 fixed relative to the casing of the stator portion 1. The bearing support 8 extends in a generally truncated cone shape, flaring from the outer ring 4a and from the housing ring 8a to the flange 9. A "squirrel cage" part 11 connects the outer ring 4a to an annular flange 10 extending inwardly from the inner wall of the bearing support 8.

Application of Force by Supplying Pressurized Oil

In order to put the rotor 2 in axial abutment at low speeds, and in particular in flight idle or approach phases as defined above, a force is generated downstream at the second bearing 17 by an axial force application device.

As such, the outer ring 17a has, in its downstream termination, a piston 170. In the present example, the piston 170 extends in a plane substantially perpendicular to the axis of the turbomachine, by about 90 degrees relative to an upper face of the outer ring 17a.

In the example of FIG. 1, the arm 16 terminates in a termination 18 which supports the piston 170. The termination 18 comprises, on its downstream face, a liner 180 extending partly over the piston 170 and party against termination 18.

The piston 170 is therefore disposed between a portion secured to the stator (the termination 18 of the arm 16) and the outer ring 17a of the bearing 17.

A chamber 171 is formed between the liner 180 and the piston 170. Said chamber 171 is supplied with pressurized oil. The monitoring of the supply of the chamber 171 with oil makes it possible to monitor the axial stroke of the piston 170, and therefore of the outer ring 17a of the bearing 17.

The arm 16 is capable of taking up the radial forces exerted on the bearing 17. In addition, the piston 170 makes it possible to axially move the outer ring 17a of the bearing 17 relative to the arm 16. The piston 170, the liner 180 and the chamber 171 can thus take up the axial forces exerted on the bearing 17.

For the supply of the piston 170, very advantageously, a circuit 14 re-pricks pressurized oil circulating in a radial damping oil circuit C of the first bearing 4.

The circuit C supplies oil to a damping cavity A extending between the housing ring 8a and the outer ring 4a. Said cavity is circumferential and intended to be supplied with damping fluid, to form a damping fluid film (or "squeeze film" according to the commonly used terminology). The squeeze film is trapped radially between the outer surface of the outer ring 4a and the housing ring 8a, and provides radial damping at the outer ring 4a, to improve the dynamic response of the turbomachine.

Preferably, the circuit C is itself supplied with lubricating and cooling oil of the bearings 4 and 17. The lubricating oil is in the form of droplets suspended in an enclosure E defined inside the bearing support 8. The enclosure E here contains the upstream bearing 4 and the downstream bearing 17.

In operation, the enclosure E is kept pressurized at the interfaces between the casing 1 and the rotor 2, so that the lubricating oil does not leak.

By way of example, the pressure in the oil enclosure E is around 1 bar on the ground and the pressure of the high-pressure circuit C varies between 7 bars at low speed and 11 bars at high speed (absolute pressure).

Figure 2:
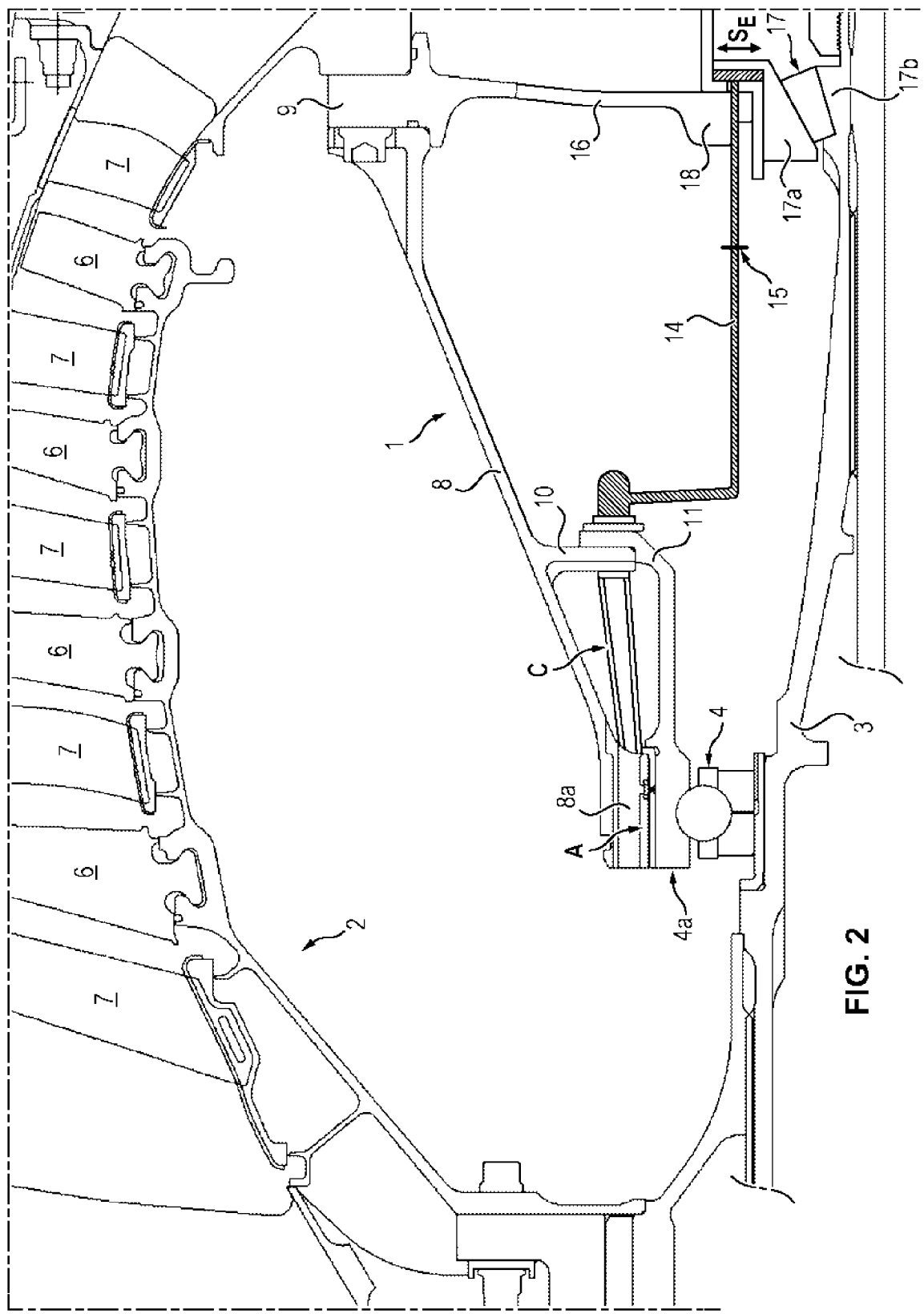
FIG. 2 is an alternate view of the module of FIG. 1, which represents an oil supply circuit.

FIG. 2 illustrates the same turbomachine front module represented in FIG. 1, the high-pressure circuit C and the supply circuit 14 of the piston 170.

In this example, the portion of the circuit C which supplies the damping cavity A extends between the housing ring 8a and the annular flange 10 which extends from the bearing support. The circuit 14 which supplies the piston comprises a duct which extends between the annular flange 10 and the chamber 171 of the piston. Thus, the circuit 14 re-pricks pressurized oil derived from the circuit C.

An advantage of this configuration is that it does not require a separate oil circuit for the supply of the piston 170. The supply of the squeeze films and of the piston is pooled.

Alternatively, the oil supply of the chamber 171 could be performed by an oil circuit separate from the damping cavity A An supply circuit C.

Returning to the example of FIG. 2, the oil at the outlet of the chamber 171 leaks directly into the enclosure E. It is mixed with the oil coming out of the rolling 4 and 17, in particular the lubricating and cooling oil of the bearings. Said oil is, preferably, recovered by a pump (not represented) of the enclosure E, to be collected in an oil reserve which serves to supply both the high-pressure circuit C and a lubricating and cooling circuit of the bearings.

The circuit 14 preferably comprises a control valve 15 which is controlled by a monitoring circuit (not represented) to close or open the circuit 14 as a function of the engine speed. For example, the valve is open for a pressurized oil supply during operating phases which require additional axial force to maintain the axial resultant on the rotor in a preferred direction. At high speed, this pressurization can be cut off, the axial force exerted on the bearing 4 by the vanes being sufficient, in the absence of contribution of the piston, to ensure that the bearing 4 does not undergo axial floating.

It will be possible to size the piston 170 as a function of the additional axial force to achieve, during the engine operating phases that require it. In particular, the axial force can be parameterized by adjusting the effective surface SE of the piston. Here, the effective surface depends on the dimensioning of the piston 170. It has been found that a constant axial force between 100 and 500 daN (decanewton), preferably between 200 and 400 daN, for example at 300 daN, is relevant for usual operating conditions of the turbomachine.

The piston device is advantageous because of its very minimal impact on the operational performance of the turbomachine. Indeed, it is not necessary to prick pressurized air at the high-pressure body to achieve the axial abutment of the low-pressure rotor. An axial reaction force is obtained at the first bearing 4, and consumes the axial clearance at the balls of said bearing 4.

In the preferred mode of FIG. 2, it is not necessary to modify the oil circuits of the turbomachine to provide an oil circuit dedicated to the piston, since the supply circuit of the squeeze films is reused.

An additional advantage is the absence of mechanical stress that would go against axial expansion of the rotor 2. Indeed, the piston 170 allows the surrounding parts to expand freely, without this expansion affecting the axial force exerted by the piston on the bearing. In addition, the piston does not rotate relative to the casing, which limits the friction and heating at the piston.

Furthermore, the axial force obtained with the piston is independent of the thermomechanical state of the parts of the front module of the turbomachine and is independent of the manufacturing tolerances of said parts.

Application of Force by Mechanical Action of a Spring

Figure 3:
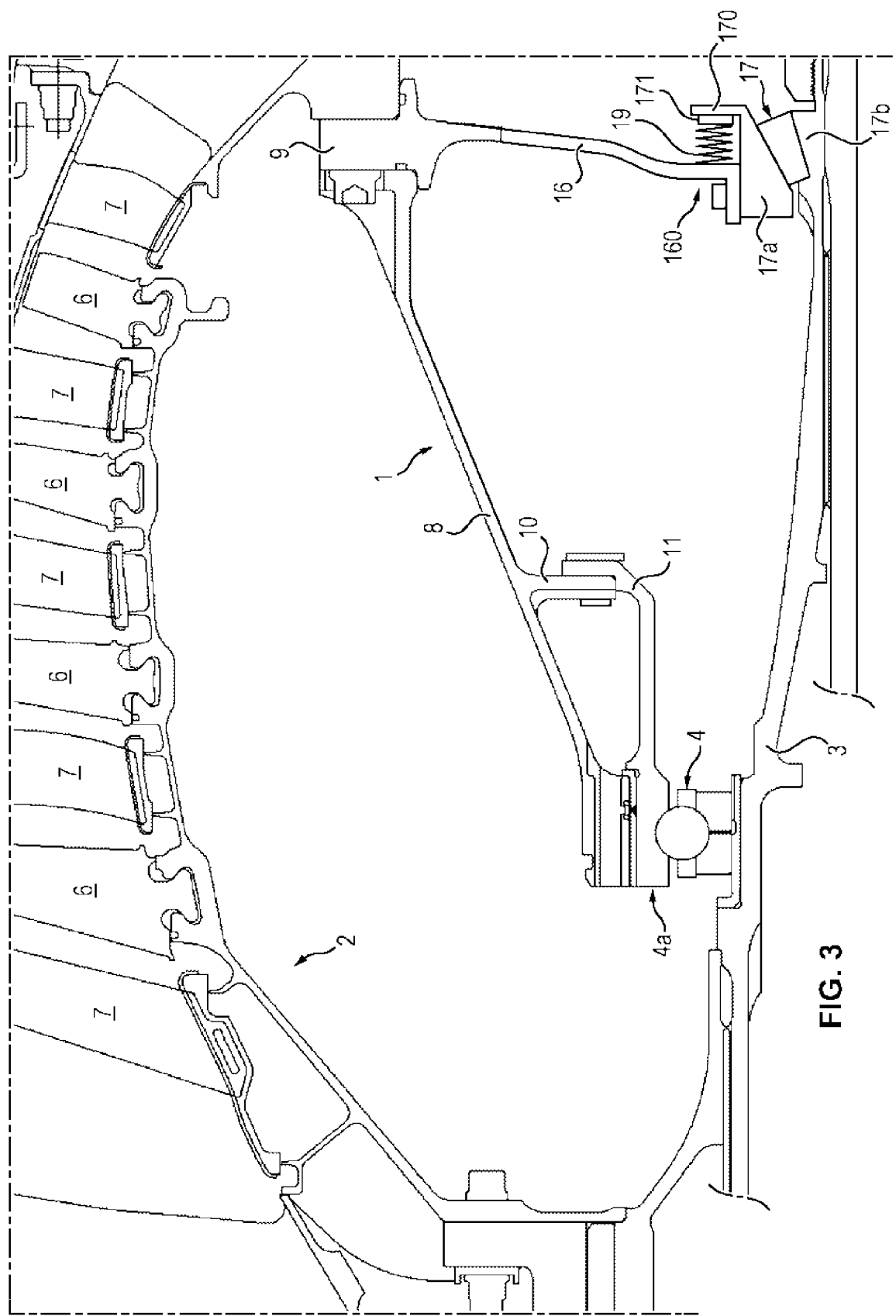
FIG. 3 is a schematic representation of a turbomachine front module according to another embodiment of the invention.

FIG. 3 represents a turbomachine front module according to an alternative embodiment. The front module of FIG. 3 has the same overall structure as the module of FIGS. 1 and 2. The first bearing 4 and the second bearing 17 are similar to the bearings of the module of FIGS. 1 and 2, with the exception of the device applying axial force on the bearing 17.

The upstream guide bearing 4 is here a ball-bearing, and the downstream guide bearing 17 is here a tapered roller bearing.

In this embodiment, the bearing 4 does not necessarily have a damping cavity A for receiving pressurized oil forming a "squeeze film".

The device for applying axial force comprises a spring 19 mounted between the arm 16 and the outer ring 17a of the bearing 17.

In the present example, the spring 19 extends between the arm 16 and the outer ring 17a of the bearing 17. More specifically, the spring 19 is mounted between a bore 160 of the arm 16 and an extension 170 of the outer ring 17a of the bearing 17. The extension 170 here has the shape of a collar which extends radially outwardly of the shaft.

Advantageously, the spring 19 can be attached to the outer ring 17a of the bearing 17 by a fastener 171. Such a fastener allows easier disassembly of the spring relative to the bearing.

Preferably, the spring 19 exerts an axial force on the bearing 17 during all flight phases, particularly during the flight phases during which the axial force exerted in addition on the upstream bearing 4 is insufficient to maintain the bearing 4 in axial abutment.

The arm 16 is capable of taking up the radial forces exerted on the bearing 17. In addition, the spring 19 makes it possible to axially move the outer ring 17a of the bearing 17 relative to the arm 16. Axial forces exerted on the bearing 17 may be taken up by the spring 19.

Thus, there is a system for applying an additional axial force on the rotor including to the low engine speeds.

In alternative embodiments, the force application device on the bearing 17 may consist of other means than a spring. The force between the stator 1 and the rotor 2 can be obtained by permanent magnets, or by non-permanent magnets. For example, a magnet may be arranged on the arm 16, and another magnet may be positioned on the outer ring 17a of the bearing 17.

In the variant with permanent magnets, the force application device may comprise a coil in a casing on the one hand, and a core movable relative to said coil on the other hand. The core and the coil can be linked the one to the stator and the other to the outer ring of the bearing 17. This variant is not represented in the appended figures.

An advantage of an axial force application device formed by magnets is to allow, depending on the needs, either a repulsive or an attractive force.

The invention claimed is:

1. A turbomachine including a stator and a rotor mounted on a shaft, the rotor including vanes in a flow path, the rotation of the shaft and the rotor with respect to the stator being ensured by a set of bearings including a first bearing and a second bearing downstream of the first bearing in a direction of air circulation at an inlet of the turbomachine, said first bearing forming an axial abutment linked to the stator on which said shaft exerts, under the effect of the rotation of the vanes, an axial force in a given direction during the main operating phases of the turbomachine,
the second bearing comprising an inner ring secured to the shaft and an outer ring mounted on an arm secured to the stator, wherein the arm comprises an arm end which is radially located opposite the outer ring and outwardly of the outer ring,
the turbomachine comprising rolling elements in axial support on the inner ring and on the outer ring,
and comprising a collar which is axially located at a downstream end of the outer ring and extends radially outwardly from the outer ring,
wherein the turbomachine further comprises an axial force application device mounted between the arm end and the collar,
wherein the force application device further comprises a piston and further comprises a pressurized oil supply system at the piston, so as to exert an axial force on the outer ring by oil supply,
wherein the turbomachine further comprises a liner, wherein the liner partly extends against a downstream face of the arm and partly extends radially outwardly of the piston, a piston chamber being formed between the liner and the piston.

2. The turbomachine according to claim 1, wherein the first bearing comprises a damping cavity arranged between an outer surface of an outer ring of the first bearing and a ring of a bearing support,
the damping cavity being connected to a damping oil supply circuit, the system for supplying pressurized oil in the piston being configured to take pressurized oil in said supply circuit.

3. The turbomachine according to claim 1, further comprising a lubrication circuit configured to circulate a lubricating oil at the bearings, and further comprising, between the first bearing and the second bearing, an enclosure intended to contain a suspension of lubricating oil droplets, the turbomachine including recovery means for recovering the oil droplets,
said recovery means being configured to collect oil escaping from a chamber of the piston, so that said oil is mixed with said droplets and collected at an oil reserve.

4. The turbomachine according to claim 2, further comprising a lubrication circuit configured to circulate a lubricating oil at the bearings, and further comprising, between the first bearing and the second bearing, an enclosure intended to contain a suspension of lubricating oil droplets, the turbomachine including means for recovering the oil droplets,
said recovery means being configured to collect oil escaping from a chamber of the piston, so that said oil is mixed with said droplets and collected at an oil reserve,
wherein the damping oil supply circuit and the lubrication circuit are both connected to the oil reserve.

5. The turbomachine according to claim 1, wherein the second bearing comprises a tapered roller bearing.

6. The turbomachine according to claim 5, wherein the tapered roller bearing comprises conical rollers,
wherein the shaft axially extends along a shaft axis and the conical rollers axially extend along a roller axis,
wherein the roller axis is inclined relative to the shaft axis, such that the upstream side of the roller axis is inclined radially inwardly of the shaft axis and the downstream side of the roller axis is inclined radially outwardly of the shaft axis.

7. A turbomachine including a stator and a rotor mounted on a shaft, the rotor including vanes in a flow path, the rotation of the shaft and the rotor with respect to the stator being ensured by a set of bearings including a first bearing and a second bearing downstream of the first bearing in a direction of air circulation at an inlet of the turbomachine, said first bearing forming an axial abutment linked to the stator on which said shaft exerts, under the effect of the rotation of the vanes, an axial force in a given direction during the main operating phases of the turbomachine,
wherein the second bearing comprises a tapered roller bearing which comprises an inner ring secured to the shaft and an outer ring mounted on an arm secured to the stator,
the tapered roller bearing comprising conical rollers in axial support on the inner ring and on the outer ring,
wherein the outer ring comprises a radially extending ring portion and the turbomachine comprises an axial force application device mounted between the arm and the ring portion, the axial force application device being configured to take up axial forces exerted on the second bearing by allowing the outer ring to axially move relative to the arm,
wherein the force application device comprises a piston, and further comprises a pressurized oil supply system at the piston so as to exert an axial force on the outer ring by oil supply,
wherein the turbomachine further comprises a liner, wherein the liner partly extends against a downstream face of the arm and partly extends radially outwardly of the piston, a piston chamber being formed between the liner and the piston.

8. The turbomachine according to claim 7, wherein the shaft axially extends along a shaft axis and the conical rollers axially extend along a roller axis,
wherein the roller axis is inclined relative to the shaft axis, such that the upstream side of the roller axis is inclined radially inwardly of the shaft axis and the downstream side of the roller axis is inclined radially outwardly of the shaft axis.

9. The turbomachine according to claim 7, wherein the first bearing comprises a damping cavity arranged between an outer surface of an outer ring of the first bearing and a ring of a bearing support, the damping cavity being connected to a damping oil supply circuit of the turbomachine, the system for supplying pressurized oil in the piston being configured to take pressurized oil in said supply circuit.

10. The turbomachine according to claim 7, wherein the turbomachine comprises a lubrication circuit configured to circulate a lubricating oil at the bearings, and an enclosure between the first bearing and the second bearing, the enclosure for containing a suspension of lubricating oil droplets, the turbomachine including recovery means for recovering the oil droplets, said recovery means being configured to collect oil escaping from a chamber of the piston, so that said oil is mixed with said droplets and collected at an oil reserve.

11. The turbomachine according to claim 9 wherein the turbomachine comprises a lubrication circuit configured to circulate a lubricating oil at the bearings, and an enclosure between the first bearing and the second bearing, the enclosure for containing a suspension of lubricating oil droplets, the turbomachine including recovery means for recovering the oil droplets, said recovery means configured to collect oil escaping from a chamber of the piston, so that said oil is mixed with said droplets and collected at an oil reserve, wherein the damping oil supply circuit and the lubrication circuit are both connected to the oil reserve.

12. The turbomachine according to claim 7, wherein the turbomachine comprises a collar which is axially located at a downstream end of the outer ring of the second bearing and extends radially outwardly from said outer ring, wherein the axial force application device is mounted between the arm end and the collar and allows the collar to axially move relative to the arm end.

* * * * *